Oct. 29, 1935. T. H. AINSWORTH 2,019,285
DRIVING WHEEL
Filed Sept. 1, 1933
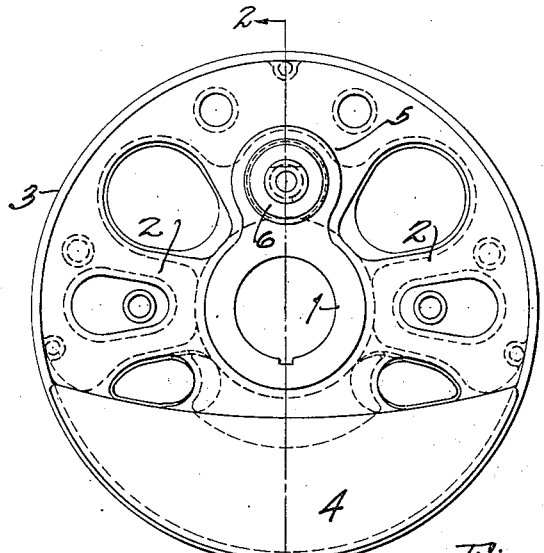
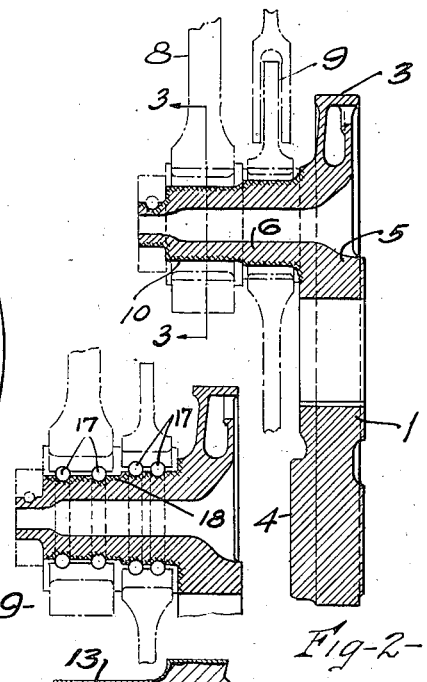
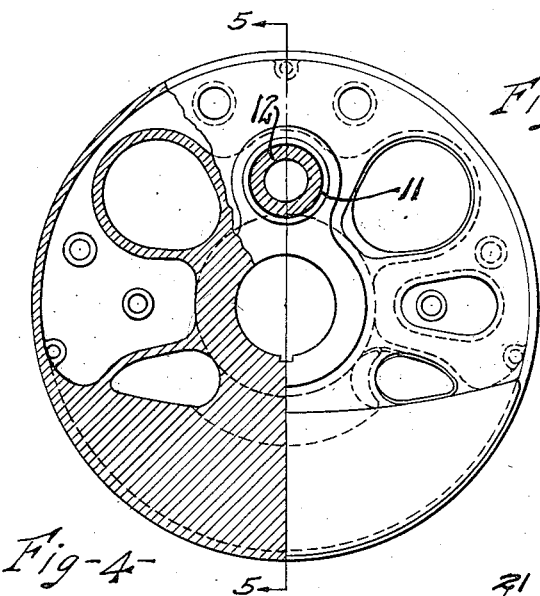
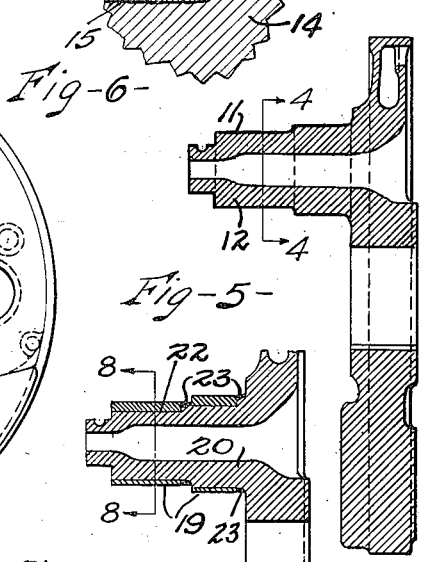
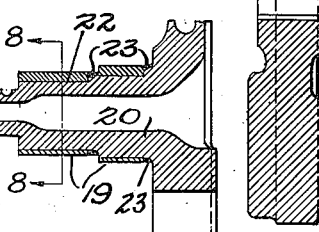
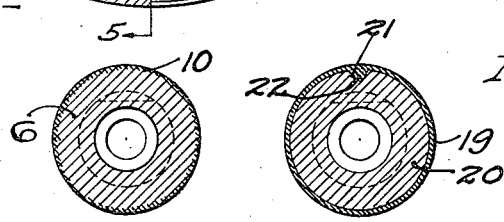
Inventor
Thomas H. Ainsworth
By Rodney Bedell
Attorney Patented Oct. 29, 1935

2,019,285

UNITED STATES PATENT OFFICE 2,019,285

DRIVING WHEEL

Thomas H. Ainsworth, Drexel Hill, Pa., assignor to General Steel Castings Corporation, Granite City, Ill., a corporation of Delaware Application September 1, 1933, Serial No. 687,733

2 Claims. (Cl. 295—2)

The invention relates to locomotive driving wheels or wheel centers and consists in a novel arrangement of the crank pin structure.

It is customary to construct the wheel center and the crank pin separately and to assemble the two elements by pressing the crank pin into the hub provided therefor on the wheel center. Obviously the crank pin hub must be of substantial size in order to accommodate the forces due to the pressing and also the forces transmitted to the wheel through the crank pin during the operation of the locomotive.

It has been proposed (Rivken Patent 1,738,393 and Sheehan and Pflager Patent 1,825,480) to cast the wheel center and crank pin integral with each other whereby some of the disadvantages attending the usual crank pin arrangement are eliminated, but so far as I am aware, the integral crank pin and wheel structure has not been used because of the wear on the crank pin which limits its useful life long before the remainder of the wheel structure becomes unserviceable. The latter of the above mentioned patents suggests the use of bushings around the integral crank pin but the constant pounding, between the connecting rods and the crank pin, transmitted through the separately formed bushings loosens them on the crank pin, permitting them to turn thereon and shortens their life. Also it is impractical, if not impossible, to provide such pins with bushed peripheral recesses as may be desired in connection with the application of anti-friction bearings between the same and the driving and connecting rods.

The objects of the present invention are to provide a thin, hard coating for a crank pin, irrespective of irregularities in the surface of the pin, where the pin is formed integrally with the wheel center whereby wear on the crank pin is avoided, the size of the crank pin is reduced, the assembly of the crank pin and the wheel center is eliminated with a resulting reduction in the size of the crank pin hub, and a corresponding decrease in the weight of the counterbalance, thereby reducing the dead weight of the wheel and permitting better balancing of smaller wheels.

These objects are attained by the construction shown in the accompanying drawing in which—

Figure 1 is a side elevation of a locomotive driving wheel center.

Figure 2 is a transverse section therethrough taken on the line 2—2 of Figure 1.

Figure 3 is a transverse section through the crank pin taken on the line 3—3 of Figure 2.

Figure 4 is in part an elevation and in part a section through a modified driving wheel center, the section being taken on the line 4—4 of Figure 5.

Figure 5 is a transverse section taken on the line 5—5 of Figure 4.

Figure 6 is an enlarged detail of a structure similar to that indicated in Figure 5.

Figure 7 is a detail section through a crank pin and adjacent wheel portion illustrating another modification.

Figure 8 is a detail section taken on the line 8—8 of Figure 7.

Figure 9 is a section corresponding to Figure 2 and illustrates another modification.

The structure illustrated in Figures 1, 2 and 3 includes an axle hub 1, spokes 2, a rim 3, a counterbalance 4, a crank pin hub 5, and a crank pin 6 having portions of different diameters.

It will be understood that the wheel body structure, and the crank pin integral therewith, are of cast metal and are annealed in the usual manner to relieve the device of strains due to the casting and cooling of such a large mass of metal and, accordingly, while the metal is tough its surface is not hard enough to serve as a friction resisting bearing. Preferably, therefore, a tire (not shown) will be applied to rim 3 instead of the tread being formed on the body.

Also to adapt the crank pin for its intended purpose the same is treated to provide a hard wear-resisting surface without unduly reducing the diameter of the pin body and its resistance to thrusts from the driving and connection rods indicated at 8 and 9. Such a surface may be produced by a heat treatment such as nitriding, carburizing, cyaniding, etc., it being understood that nitriding consists in heating the crank pin portion of the casting and exposing it while heated to ammonia gas; and carburizing involves the heating of the crank pin structure while in contact with carbonaceous material; and cyaniding involves the treatment of the surface of the pin with potassium cyanide.

The result of any of these or similar treatments is the production of a relatively tough crank pin body with a hardened surface case 10 which is relatively thin and forms a coherent part of the pin structure, elements of the case forming material penetrating into, interlocked with, or merging with elements of the tough cast metal body or core so that there will be no loosening or separation of the wearing elements of the crank pin from the body thereof. Hence the life of the wheel center is not unduly restricted because of the integral construction of the crank pin and the advantages attendant upon such integral structure may be utilized without objectionable disadvantages which have previously accompanied suggested integral structures.

In Figures 4 and 5 I have indicated the production of a hardened wear surface 11 for the crank pin 12 by plating the same with a hard different metal such as chromium, cobalt, tungsten, carbide. This corresponds to a certain extent to the treatment previously described in that the particles of the metal plating will penetrate and adhere so closely to the outer particles of the cast body of the pin that a homogeneous structure results, also eliminating any loosening or separation of the wearing member from the body of the pin. In both of the constructions described above, the thickness of the wearing surface would be so small that the diameter of the pin is not materially increased and as a result it will not be necessary to increase the size of connecting rod and driving rod bushings.

Another method of coating the body of the crank pin with any of the metals mentioned in the preceding paragraph, or with various alloys thereof, is by flowing a surface forming metal 13 (Figure 6) onto the crank pin body 14 by using an oxy-acetylene torch or an electric arc to heat the end of a rod of the coating metal to melt the same and weld or fuse it with the pin body. This results in a homogeneous joint between the metals 13 and 14, as indicated at 15. The coating will be thicker than is likely to result from the plating indicated in Figure 5.

Another arrangement intermediate the structures described above and the plain bushing arrangement shown in the above mentioned Sheehan and Pflager patent is illustrated in Figures 7 and 8 in which a thin hard bushing 19 is applied over the pin 20 but the latter is grooved longitudinally as indicated at 21 and the bushing includes a corresponding ridge 22 fitting in the groove 21 and positively resisting rotation of the bushing against the body of the pin. In addition, the bushing and pin body are united by welding the same together along adjacent elements and preferably by adding welding material 23.

The advantages of the above described construction are particularly noticeable in the formation of crank pin body with a hardened surface as for receiving ball bearings, indicated in Figure 9, in which the crank pin is grooved peripherally for seating the balls 17 and the indented surface is hardened or coated as at 18 just as easily as a more regular surface. If a grooved bushing were applied to the pin body, the outside diameter of the composite pin would be increased to a disadvantageous degree.

Each of the constructions described attains the advantages set forth at the beginning of the specification to a marked degree and embodies the feature of modifying the surface of the crank pin so that a peripheral case of hard material is united with the body of the crank pin and its elements are imbedded in, or are fused with, the relatively softer metal of the pin body, and the case is adapted to resist the ordinarily destructive forces encountered in the operation of a locomotive driving wheel. Other methods and materials for coating the pin body may be used without departing from the spirit of the present invention and I contemplate the exclusive use of such modifications as come within the scope of my claims.

I claim:

1. A railway driving wheel structure including an integral crank pin body, the periphery of said pin consisting of a thin relatively hard case including grooves for receiving anti-friction bearing structure.

2. A railway driving wheel structure of cast metal including an integral crank pin body, said pin body being grooved circumferentially, and the periphery of said pin body, including its groove faces, comprising a thin layer of relatively hard material partially imbedded in the pin body material.

THOMAS H. AINSWORTH.